US012624970B2

(12) United States Patent
Vu et al.

(10) Patent No.: US 12,624,970 B2
(45) Date of Patent: May 12, 2026

(54) METHODS AND APPARATUS FOR DETECTING CARRIER TAPE HEIGHT LEVEL AND THICKNESS USING FIBER OPTIC SENSORS

(71) Applicant: Intel Corporation, Santa Clara, CA (US)

(72) Inventors: Ngoc Duy Vu, Ho Chi Minh (VN); Nguyen Hoang Tan Le, Ho Chi Minh (VN); Minh Anh Khoa Nguyen, Bien Hoa (VN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/970,394

(22) Filed: Oct. 20, 2022

(65) Prior Publication Data

US 2024/0133718 A1     Apr. 25, 2024
US 2024/0230381 A9     Jul. 11, 2024

(51) Int. Cl.
*G01D 5/353* (2006.01)
*B65B 11/52* (2006.01)
*B65B 57/02* (2006.01)

(52) U.S. Cl.
CPC .............. *G01D 5/353* (2013.01); *B65B 11/52* (2013.01); *B65B 57/02* (2013.01)

(58) Field of Classification Search
CPC .......... G01D 5/353; B65B 11/52; B65B 57/02
See application file for complete search history.

(56) References Cited

U.S. PATENT DOCUMENTS

2003/0024216 A1* 2/2003 Behnke .................. B65B 9/045
53/473

* cited by examiner

*Primary Examiner* — Jamil Ahmed
(74) *Attorney, Agent, or Firm* — Gray Ice Higdon, PLLC

(57) ABSTRACT

The disclosure is directed to apparatus and methods for detection of out of position (OOP) components in a carrier tape forming machine. An apparatus includes cross track sensors coupled to the bus interface circuitry, the cross track sensors configured to detect OOP components prior to overlaying the components on the carrier tape with cover tape, optical sensors to detect the OOP components on the carrier tape after overlaying with cover tape and prior to sealing and to detect reflections from OOP components seated on the carrier tape, an amplifier coupled to the optical sensors to amplify signals generated by the optical sensors and set a range for determining whether the components are OOP, and relays to receive indications of detected OOP components, and a controller coupled to the relays to stop the carrier tape forming machine as a function of signals received by the relays.

20 Claims, 8 Drawing Sheets

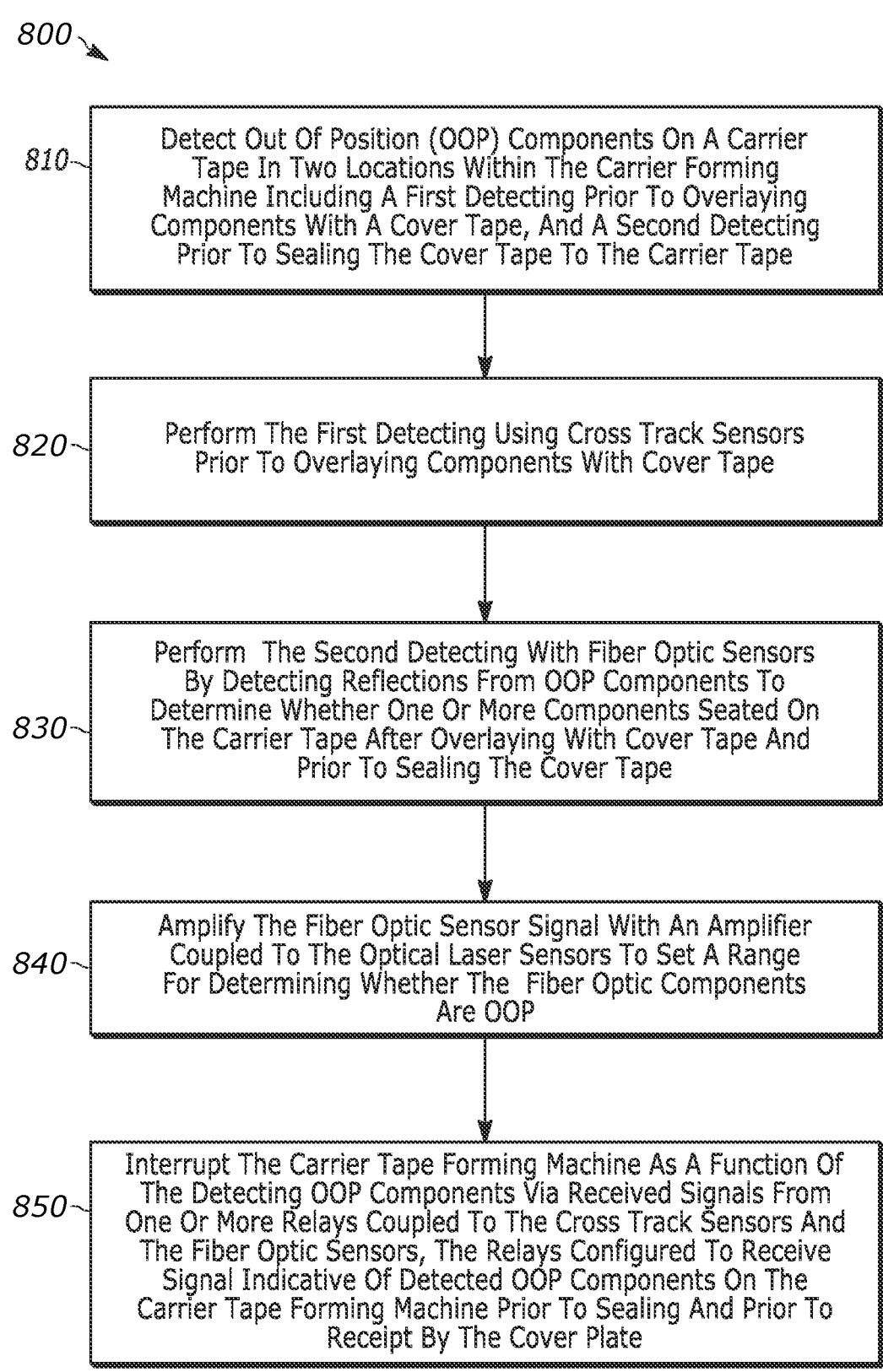

800

810 — Detect Out Of Position (OOP) Components On A Carrier Tape In Two Locations Within The Carrier Forming Machine Including A First Detecting Prior To Overlaying Components With A Cover Tape, And A Second Detecting Prior To Sealing The Cover Tape To The Carrier Tape 820 — Perform The First Detecting Using Cross Track Sensors Prior To Overlaying Components With Cover Tape 830 — Perform The Second Detecting With Fiber Optic Sensors By Detecting Reflections From OOP Components To Determine Whether One Or More Components Seated On The Carrier Tape After Overlaying With Cover Tape And Prior To Sealing The Cover Tape 840 — Amplify The Fiber Optic Sensor Signal With An Amplifier Coupled To The Optical Laser Sensors To Set A Range For Determining Whether The Fiber Optic Components Are OOP 850 — Interrupt The Carrier Tape Forming Machine As A Function Of The Detecting OOP Components Via Received Signals From One Or More Relays Coupled To The Cross Track Sensors And The Fiber Optic Sensors, The Relays Configured To Receive Signal Indicative Of Detected OOP Components On The Carrier Tape Forming Machine Prior To Sealing And Prior To Receipt By The Cover Plate

FIG. 8

METHODS AND APPARATUS FOR DETECTING CARRIER TAPE HEIGHT LEVEL AND THICKNESS USING FIBER OPTIC SENSORS

FIELD OF THE DISCLOSURE

This disclosure generally relates to field of carrier tape manufacturing, and more particularly relates to methods and apparatus for detecting out of place components prior to sealing carrier tapes.

BACKGROUND

Carrier tape forming machines package electronic components such as integrated circuits, resistors, capacitors, transistors, by packing in a cavity. Upper cover tapes close over the components on a carrier tape and then the carrier tape is stored in a reel. The reel protects the electronics from contamination during transportation and storage. Unfortunately, during the manufacturing process out of position (OOP) components on a carrier tape may damage components or result in unusable reels and the like. For example, the components may be off-center or not aligned correctly which may result in stopping the carrier tape forming process altogether. What is needed are techniques that detect OOP components efficiently on carrier tape as the carrier tape is formed with components.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 8 illustrates a flow diagram of a method in accordance with an embodiment of the disclosure.

DETAILED DESCRIPTION

Figure 1:
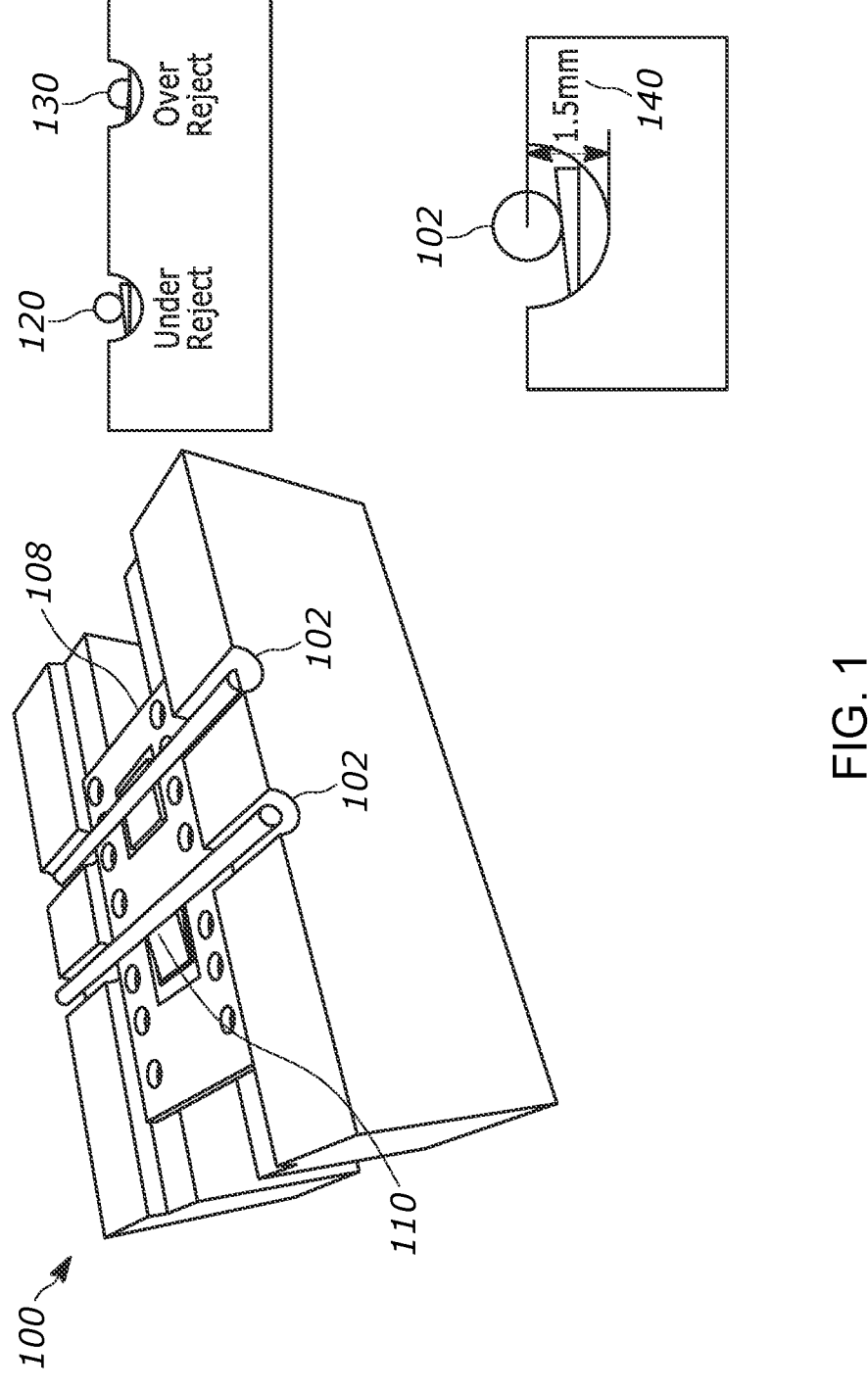
FIG. 1 illustrates an example carrier tape forming machine in accordance with an embodiment of the disclosure.

In terms of a general overview, this disclosure is generally directed to apparatus and methods for detecting out of position (OOP) or out of pocket components to be stored in a carrier tape using a carrier tape forming machine.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Embodiments are directed to an apparatus for detection of out of position (OOP) components in a carrier tape forming machine. In one or more embodiments, the apparatus includes cross track sensors coupled to the bus interface circuitry, the cross track sensors configured to detect OOP components prior to overlaying the components on the carrier tape with cover tape; optical sensors to detect the OOP components on the carrier tape after overlaying with cover tape and prior to sealing, the optical sensors configured to detect reflections from OOP components seated on the carrier tape; an amplifier coupled to the optical sensors, the amplifier coupled to amplify signals generated by the optical sensors and set a range for determining whether the components are OOP; one or more relays coupled to the cross track sensors and the optical sensors, the relays configured to receive indications of detected OOP components in the carrier tape forming machine prior to sealing or prior to receipt by the cover plate; and a controller coupled to the one or more relays to stop the carrier tape forming machine as a function of signals received by the relays.

Another embodiment is directed to a method for a carrier tape forming machine including detecting out of position (OOP) components on a carrier tape in two locations within the carrier forming machine including a first detecting prior to overlaying components with a cover tape, and a second detecting prior to sealing the cover tape to the carrier tape; performing the first detecting using cross track sensors prior to overlaying components with cover tape; performing the second detecting with fiber optic sensors by detecting reflections from OOP components to determine whether one or more components seated on the carrier tape after overlaying with cover tape and prior to sealing the cover tape; amplifying the fiber optic sensor signal with an amplifier coupled to the fiber optic sensors to set a range for determining whether the components are OOP; and stopping the carrier tape forming machine as a function of the detecting OOP components via received signals from one or more relays coupled to the cross track sensors and the fiber optic sensors, the relays configured to receive signal indicative of detected OOP components on the carrier tape forming machine prior to sealing and prior to receipt by the cover plate.

Referring now to FIG. 1, a carrier tape forming machine 100 is illustrated showing two cross track sensors 102 a carrier tape 108, and components 110 disposed with in pockets on the carrier tape. As shown, one cross track sensor detects whether components are below a sensor area as an "under reject" 120, and another cross track sensor detects whether components are over a sensor area as an "over reject" 130. As shown, a close up of the pocket 140 and cross track sensor 102 enables sensing covering the 1.5 mm distance 140 of the pocket.

Figure 2:
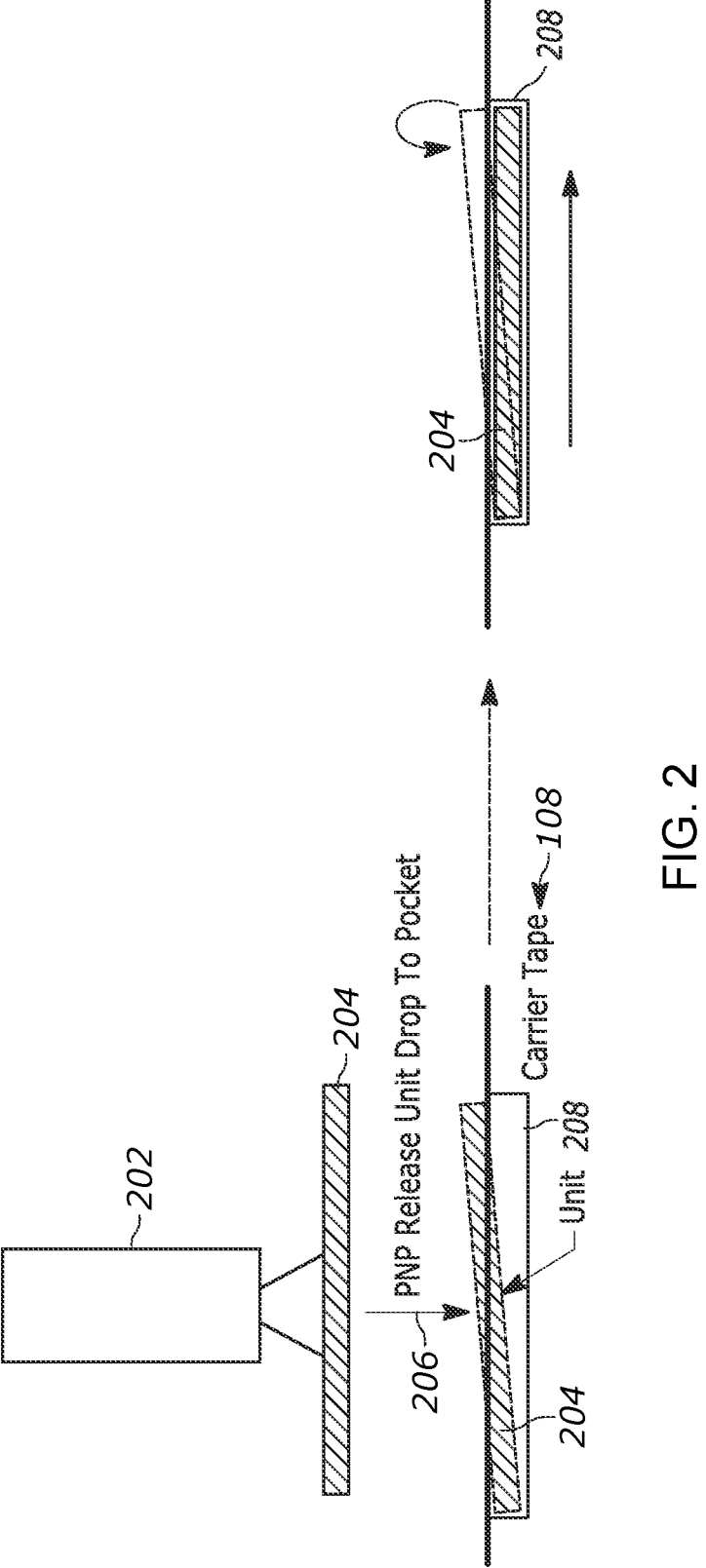
FIG. 2 illustrates another view of a carrier tape forming machine including a pick and place (PNP) releasing a component onto a pocket within a carrier tape in accordance with an embodiment of the disclosure.

FIG. 2 illustrates a pick and place machine 202 dropping a unit 204 onto a carrier tape 208 followed by the unit 204 becoming seated into pocket 208 after moving along within carrier tape forming machine 100.

Figure 3:
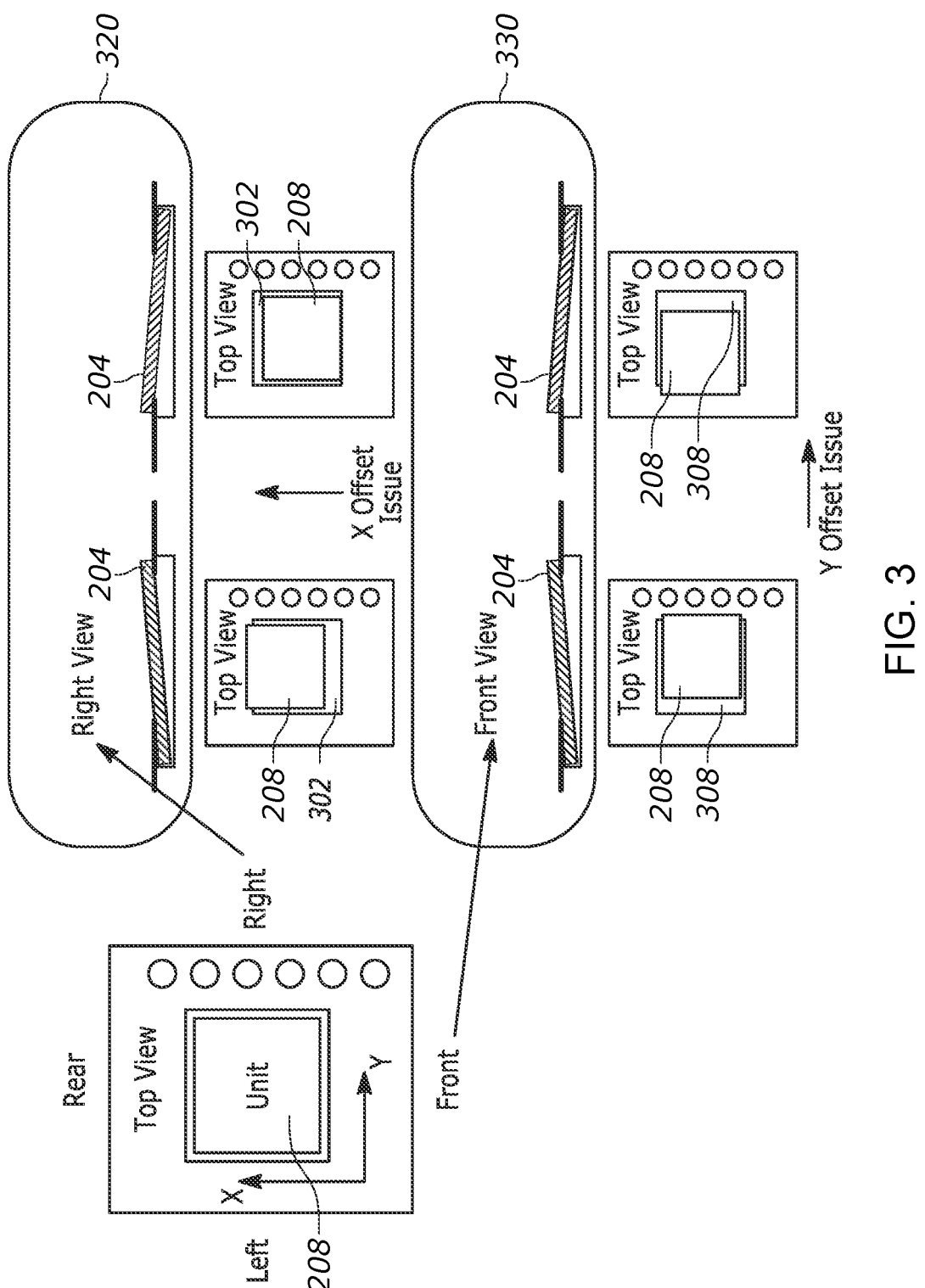
FIG. 3 illustrates a carrier tape with offset component views in accordance with an embodiment of the disclosure.

FIG. 3 illustrates different offset possibilities that could justify resetting or stopping a carrier tape forming machine. As shown, a pocket 208 is illustrated with unit 204 in different offset positions that may be identified, from a top view, a bottom offset 302, a top offset 304, a right side offset 308 and a left side offset 310 are illustrated as well as side views from the right, 320, and side views from the front 330. The offsets along an x axis as the unit is moving under pick and place machine 202 may be caused by issues controlled by a stepper motor. Issues causing a y axis offset may be caused by issues controlled by a servo motor. Thus two different motors must be synchronized to enable the carrier tape forming machine to accurately place units with pocket 208. In other words, two machines enable pick and place machines to drop component units into pockets as a carrier tape moves along an x axis.

Figures 4, 5:
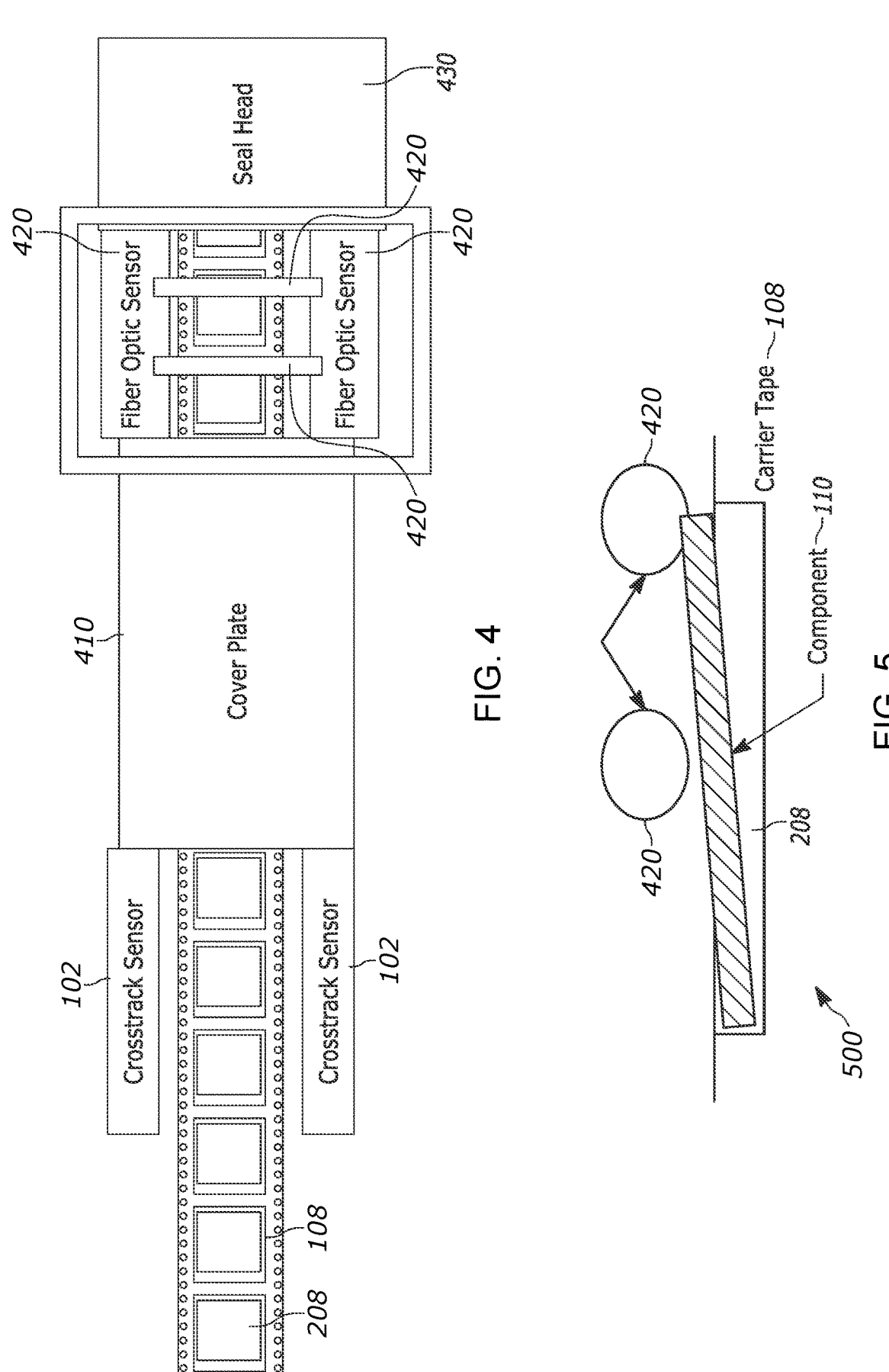
FIG. 4 illustrates an overhead view of a carrier tape forming machine including a cross track sensor portion, a cover plate portion, a fiber optic sensor portion and a seal head in accordance with an embodiment of the disclosure.
FIG. 5 illustrates a side view of a carrier tape with a pocket for components in accordance with various embodiments of the disclosure.

Referring now to FIG. 4, an embodiment is directed to adding additional sensors to carrier tape forming machine 100. As shown, cross track sensors 102 review carrier tape 108 to detect offset issues regarding components in pockets 208 prior to the carrier tape 108 entering cover plate area 410 where cover tape is placed over the carrier tape to seal components within pocket 208.

In an embodiment, after cover tape is placed fiber optic sensors 420 view the carrier tape to detect out of position (OOP) components prior to the carrier tape entering into seal head 430 where the cover tape is heat sealed onto the carrier tape.

Referring to FIG. 5, a side view 500 illustrates fiber sensors 420 able to detect OOP component 110 misplaced on carrier tape 108. As shown, fiber sensors 402 detect the offset component 110 on carrier tape 108 on the right side of pocket 208.

Figure 6:
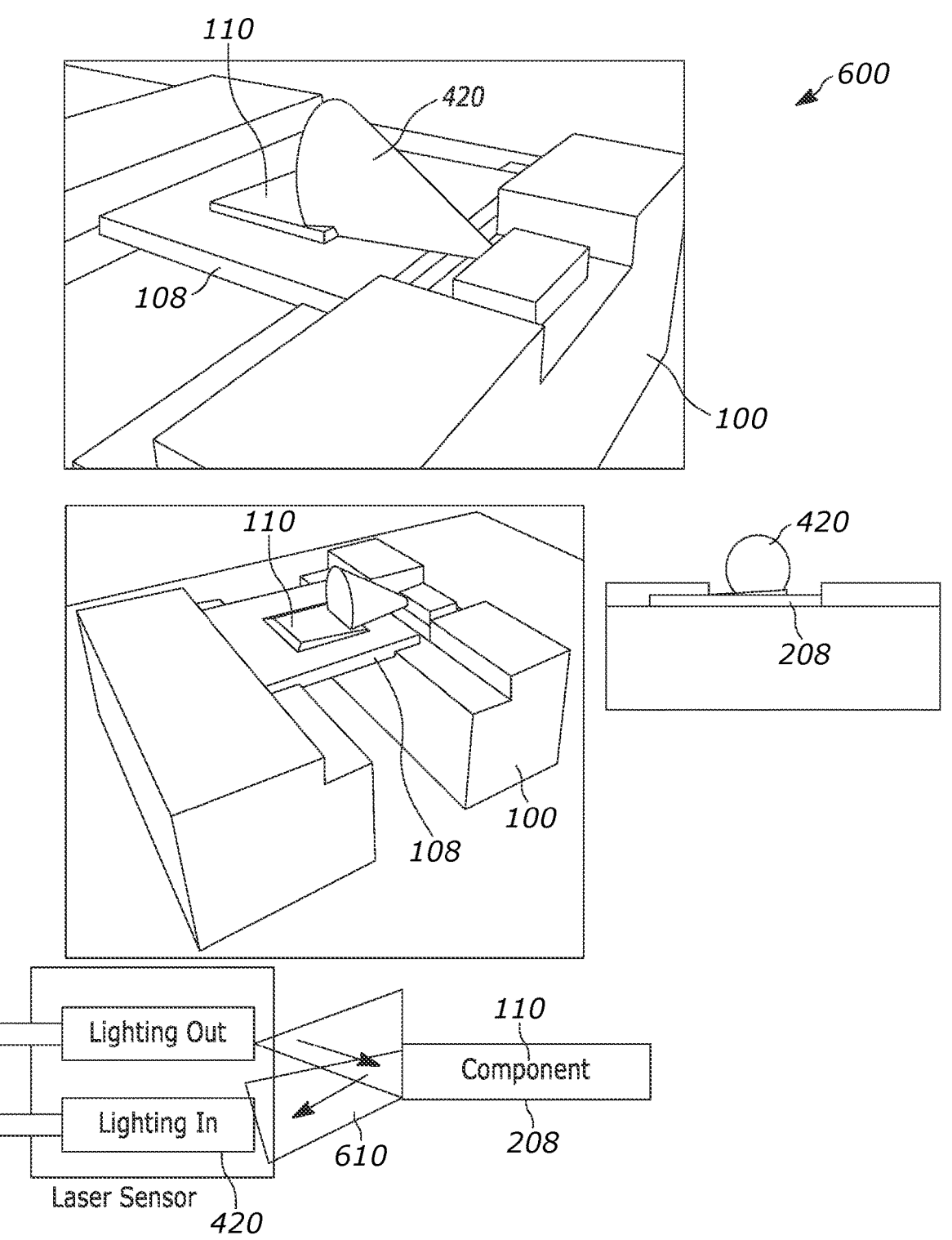
FIG. 6 illustrates a carrier tape forming machine with a fiber optic sensor focused on a component in a pocket in accordance with various embodiments of the disclosure.

Referring to FIG. 6 views 600 illustrate different perspective views of machine 100 where fiber optic sensors 420 are aimed component 110. As shown, fiber 420 is aimed at pocket 208 on carrier tape 108. As shown, fiber optic sensors 420 receives reflection 610 from pocket 208 able to view component 110.

Figure 7:
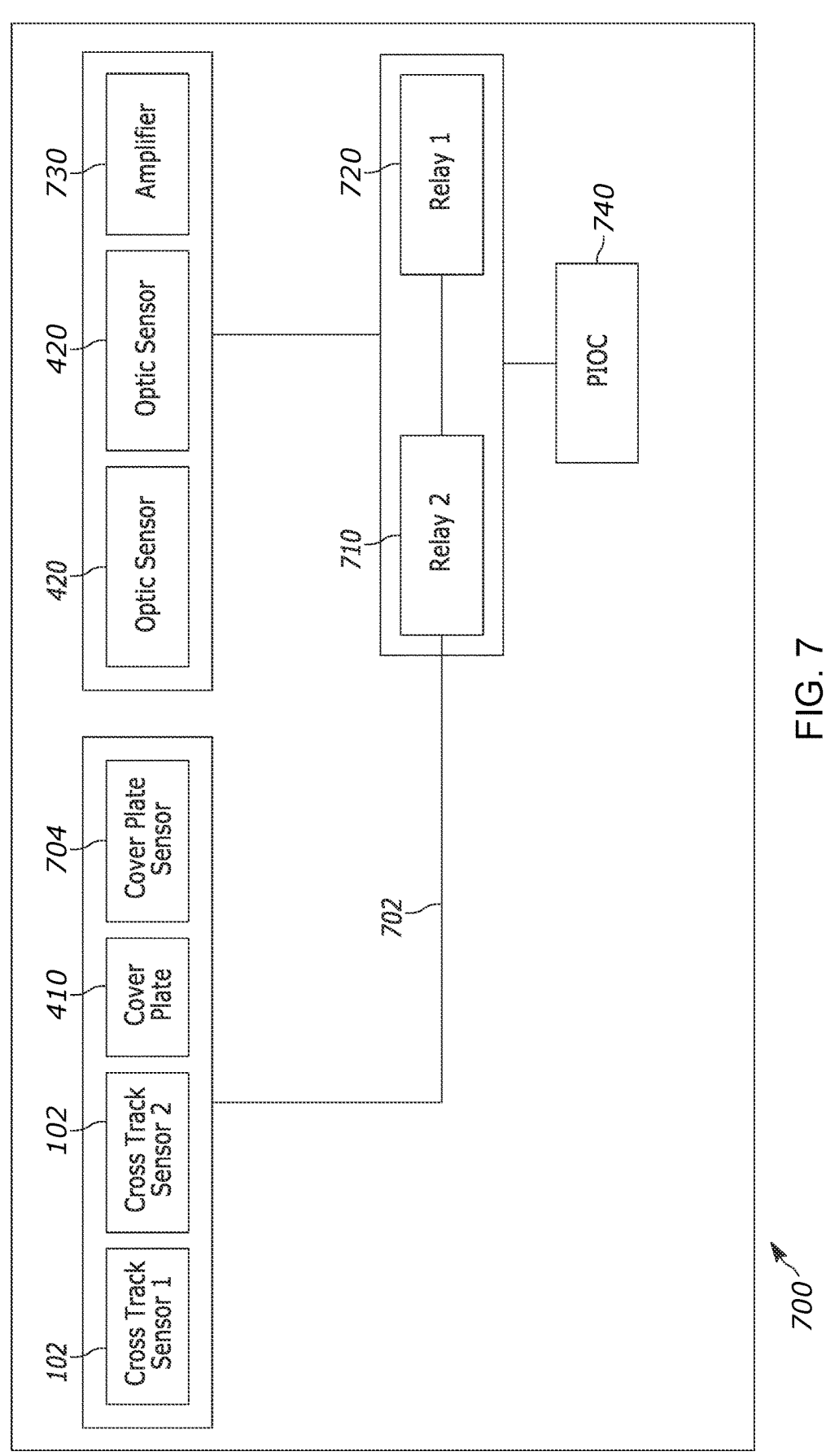
FIG. 7 illustrates an electrical schematic diagram of a carrier tape forming machine with sensors in accordance with various embodiments of the disclosure.

Referring now to FIG. 7, a schematic view 700 illustrates embodiments for including fiber optic sensors within carrier tape forming machine 100. As shown, in one embodiment, cross track sensors 102 are coupled via bus circuitry 702 to sensors within cover plate 410 wherein a cover plate sensor 704 supports a cover tape installation over the carrier tape. Bus circuitry 702 is further coupled to relays 710 and 720 which are coupled to fiber optic sensors 420 and amplifier 730. In one embodiment, relay 710 receives OOP detection indications from cross track sensors 102, and relay 720 receives OOP detection indications from fiber optic sensors 420. Fiber optic sensors 420 are further coupled to amplifier 730 to control the size of reflection 610 shown in FIG. 6. Amplifier 730 enables different sizes of beams to accommodate different size components 110 as well as different sized carrier tapes 108.

FIG. 7 further illustrates a parallel input output controller (PIOC) 740 that receives signals from relays 710 and 720. PIOC 740 may be a controller or other logic controller as will be appreciated by those of skill in the art. More specifically, in one embodiment, relays 710 and 720 may both detect OOP components, in which case, PIOC 740 may be configured to stop carrier tape forming machine 100. In another embodiment, either 710 or 720 may detect OOP components and be configured to stop carrier tape forming machine 100. In another embodiment, if 710 detects an OOP component but 720 does not detect an OOP component, a component may have settled into pocket 208 and not require stopping carrier tape forming machine 100.

In some embodiments, controller 740 may apply logic such that an AND function determines whether to turn off carrier tape forming machine 100. In other embodiments, an OR function, such that either relay determining an OOP component will turn off carrier forming machine 100. In another embodiment, if cross track sensors are known to fail or be inaccurate, relay 710 may be set to a "don't care" such that only relay 720 is coupled to determine whether to pause or stop carrier tape forming machine 100.

As shown in FIG. 7, amplifier 730 enables different size tapes and different components to be used in carrier tape forming machine. More specifically, as shown in Table A below, fiber optic sensors 420 may be configured with different carrier tape sizes. Thus, the same machine may accommodate different sized tapes and still detect OOP components if amplifier 730 is adjusted as shown in Table A.

TABLE A

| Carrier Tape | Left Sensor | | | Right Sensor | | |
| | limit L | No OOP | Unit OOP | Limit R | No OOP | Unit OOP |
|---|---|---|---|---|---|---|
| 44 mm | 400 | 150-350 | 1000-5400 | 400 | 150-350 | 1000-5400 |
| 24 mm | 600-650 | 180-550 | 1000-5400 | 300 | 180-275 | 1000-3000 |

Referring now to FIG. 8, a flow diagram 800 illustrates a method in accordance with one or more embodiments. More particularly, block 810 provides for detecting out of position (OOP) components on a carrier tape in two locations within the carrier forming machine including a first detecting prior to overlaying components with a cover tape, and a second detecting prior to sealing the cover tape to the carrier tape. For example, as shown in FIG. 4, two locations detect OOP components, cross tack sensor location 102 and fiber optic sensor location 420.

Block 820 provides for performing the first detecting using cross track sensors prior to overlaying components with cover tape. For example as shown in FIG. 1, cross track sensors 102 are configured to detect OOP components by detecting over and under rejections of placement of components 110 on carrier tape 108 within carrier tape forming machine 100.

Block 830 provides for performing the second detecting with fiber optic sensors by detecting reflections from OOP components to determine whether one or more components seated on the carrier tape after overlaying with cover tape and prior to sealing the cover tape. For example, as shown in FIG. 5, fiber optic sensors 420 detect whether component 110 is correctly seated within pocket 208 on carrier tape 108.

Block 840 provides for amplifying the fiber optic sensor signal with an amplifier coupled to the fiber optic sensors to set a range for determining whether the components are OOP. For example, FIG. 7 illustrates amplifier 730 capable of setting a range for determining whether components 110 are OOP on a carrier tape.

Block 850 provides for interrupting the carrier tape forming machine as a function of the detecting OOP components via received signals from one or more relays coupled to the cross track sensors and the fiber optic sensors, the relays configured to receive signal indicative of detected OOP components on the carrier tape forming machine prior to sealing and prior to receipt by the cover plate. For example, as shown in FIG. 7, relays are coupled to cross track sensors 102 and fiber optic sensors 420 to receive signals of detected OOP components. Depending on the logic function or other method for determining conditions for interrupting the carrier tape forming machine, a controller may be configured to interrupt the carrier tape forming machine as a function of the detection signal received by relays 710 and 720.

Figure 9:
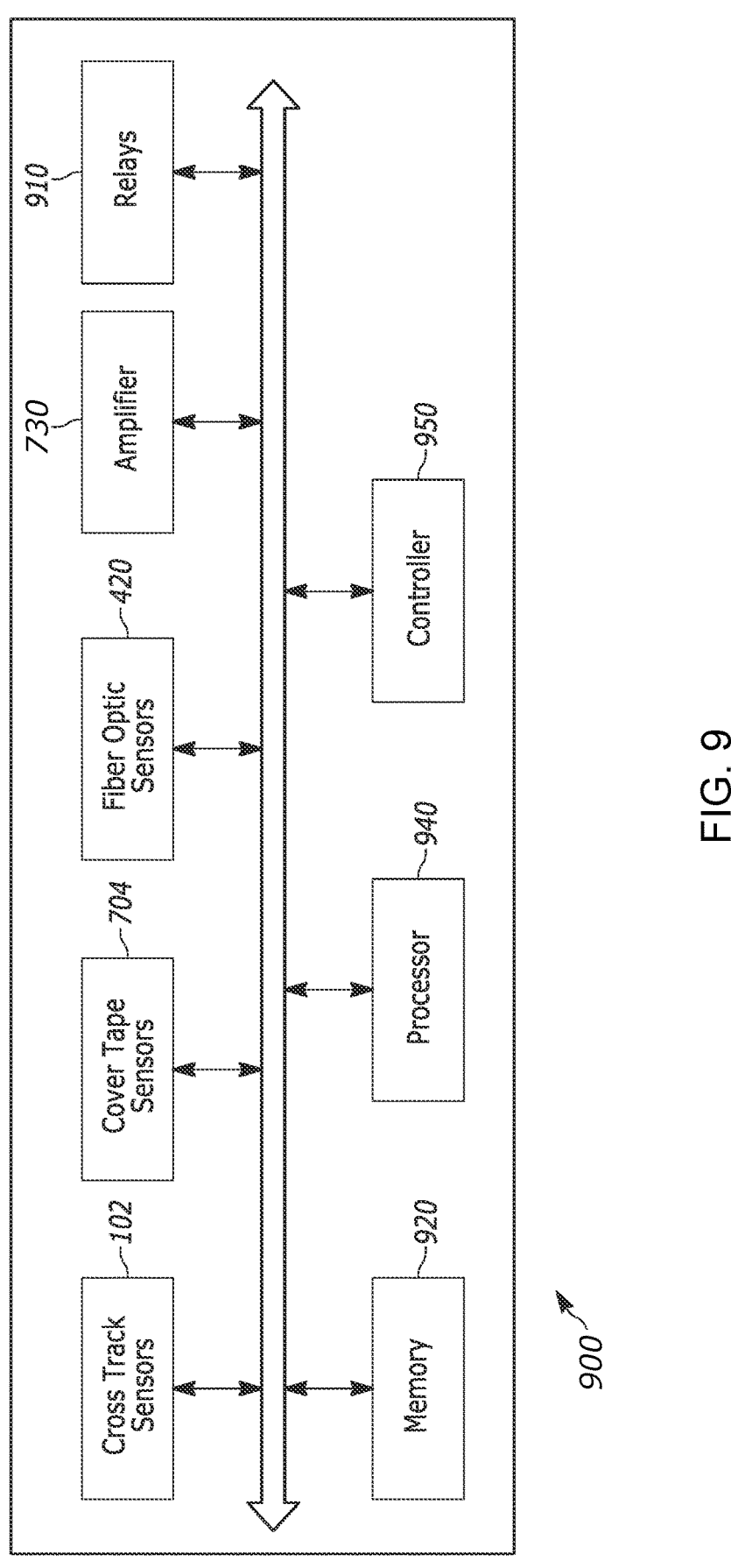
FIG. 9 illustrates a system diagram for implementing a carrier tape forming machine in accordance with an embodiment of the disclosure.

Referring now to FIG. 9, a system diagram illustrates a carrier tape forming machine diagram. As shown, system 900 includes cross track sensors 102, cover tape sensors 704, fiber optic sensors 420, amplifier 730, relays 910, memory 920, processor 940 and controller 950 all coupled to bus circuitry 960.

In accordance with embodiments, memory 920 is coupled to processing circuitry 940, which is configured to detect out of position (OOP) components on carrier tape in two locations within the carrier forming machine by performing a first detection prior to overlaying components with a cover tape, and a second detection prior to sealing the cover tape to the carrier tape. For example, as described above, sensors are provided before cover tape is installed in cover plate 410, by performing the first detection using cross track sensors prior to overlaying components with cover tape. Further, processor is configured to perform the second detection using fiber optic sensors 420 by detecting reflections from OOP components to determine whether one or more components seated on the carrier tape after overlaying with cover tape and prior to sealing the cover tape.

Amplifier 730 is configured to amplify the fiber optic sensor signal with an amplifier coupled to the fiber optic sensors to set a range for determining whether the components are OOP. Relays 910 and controller 950 are also coupled to bus circuitry 960. In one embodiment, processor 940 enables the controller 950 to interrupt the carrier tape forming machine as a function of the detection of OOP components via received signals from one or more relays 910 coupled to the cross track sensors 102 and the fiber optic sensors 402, the relays 910 configured to receive signal indicative of detected OOP components on the carrier tape forming machine prior to sealing and prior to receipt by the cover tape.

As one of skill in the art will appreciate, processor 940 may include modules to enable programming of controller 950 to perform actions based on the detections provided by relays 910. Additionally, processor 940 may include modules to enable amplifier 730 to increase or decrease amplification of fiber optic sensors 420 as a function of the type of components to be packed in a carrier tape or based on the size of the carrier tape.

For example, wherein the components are large scale integration (LSI) type components including integrated circuits (ICs), computer components, server components and computer components sized to fit into a carrier tape pocket.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes cross track sensors coupled to the bus interface circuitry. The cross track sensors also includes optical sensors to detect the oop components on the carrier tape after overlaying with cover tape and prior to sealing, the optical sensors configured to detect reflections from oop components seated on the carrier tape. The sensors also includes an amplifier coupled to the optical sensors, the amplifier coupled to amplify signals generated by the optical sensors and set a range for determining whether the components are oop. The sensors also includes one or more relays coupled to the cross track sensors and the optical sensors, the relays configured to receive indications of detected oop components in the carrier tape forming machine prior to sealing or prior to receipt by the cover plate. The sensors also includes a controller coupled to the one or more relays to stop the carrier tape forming machine as a function of signals received by the relays. Other embodiments of this aspect include corresponding computer systems, apparatus, and computer programs recorded on one or more computer storage devices, each configured to perform the actions of the methods.

Implementations may include one or more of the following features. The apparatus may include bus interface circuitry coupled to the optical sensors and the amplifier, the bus interface circuitry connectable within the carrier tape forming machine to the controller. The optical sensors are a pair of fiber optic sensors. The sealing includes applying heat to seal a cover tape onto carrier tape to cover components. Out of position (oop) components are outside a pocket in the carrier tape or components are offset in an x direction or in a y direction on the carrier tape. The cross track sensors may include at least two photoelectric sensors. The optical sensors receive the range for oop from the amplifier as a function of a size of the carrier tape. Size of the carrier tape is 44 mm with an oop limit of 400 on each side of the carrier tape for 44 mm tape. Size of the carrier tape is 24 mm, with an oop limit of between 600 and 650 for a left side and 300 for a right side. The components are large scale integration (lsi) type components including integrated circuits (ics), computer components, server components and computer components sized to fit into a carrier tape pocket. Implementations of the described techniques may include hardware, a method or process, or computer software on a computer-accessible medium.

One general aspect includes a method for a carrier tape forming machine. The method also includes detecting out of position (oop) components on a carrier tape in two locations within the carrier forming machine including a first detecting prior to overlaying components with a cover tape, and a second detecting prior to sealing the cover tape to the carrier tape; performing the first detecting using cross track sensors prior to overlaying components with cover tape; performing the second detecting with fiber optic sensors by detecting reflections from oop components to determine whether one or more components seated on the carrier tape after overlaying with cover tape and prior to sealing the cover tape; amplifying the fiber optic sensor signal with an amplifier coupled to the fiber optic sensors to set a range for determining whether the components are oop; and interrupting the carrier tape forming machine as a function of the detecting oop components via received signals from one or more relays coupled to the cross track sensors and the fiber optic sensors, the relays configured to receive signal indicative of detected oop components on the carrier tape forming machine prior to sealing and prior to receipt by the cover plate. Other embodiments of this aspect include corresponding computer systems, apparatus, and computer programs recorded on one or more computer storage devices, each configured to perform the actions of the methods.

Implementations may include one or more of the following features. The method where the sealing includes applying heat to seal a cover tape onto carrier tape to cover components. Out of position (oop) components are outside a pocket in the carrier tape or components are offset in an x direction or in a y direction on the carrier tape. The cross track sensors may include at least two photoelectric sensors. The optical sensors receive the range for oop from the amplifier as a function of a size of the carrier tape. Size of the carrier tape is 44 mm with an oop limit of 400 on each side of the carrier tape for 44 mm tape. Size of the carrier tape is 24 mm, with an oop limit of between 600 and 650 for a left side and 300 for a right side. The components are large scale integration (lsi) type components including integrated circuits (ics), computer components, server components and computer components sized to fit into a carrier tape pocket. Implementations of the described techniques may include hardware, a method or process, or computer software on a computer-accessible medium.

One general aspect includes a system for a carrier tape forming machine. The system also includes a memory. The system also includes processing circuitry coupled to the memory, the processing circuitry configured to: detect out of position (oop) components on a carrier tape in two locations within the carrier forming machine by performing a first detection prior to overlaying components with a cover tape, and a second detection prior to sealing the cover tape to the carrier tape. The system also includes perform the first detection using cross track sensors prior to overlaying components with cover tape; perform the second detection with fiber optic sensors by detecting reflections from oop components to determine whether one or more components seated on the carrier tape after overlaying with cover tape and prior to sealing the cover tape; amplify the fiber optic sensor signal with an amplifier coupled to the fiber optic sensors to set a range for determining whether the components are oop; and interrupt the carrier tape forming machine as a function of the detection of oop components via received signals from one or more relays coupled to the cross track sensors and the fiber optic sensors, the relays configured to receive signal indicative of detected oop components on the carrier tape forming machine prior to sealing and prior to receipt by the cover tape. Other embodiments of this aspect include corresponding computer systems, apparatus, and computer programs recorded on one or more computer storage devices, each configured to perform the actions of the methods.

Implementations may include one or more of the following features. The system where the amplifier enables the carrier tape forming machine to detect oop components and form carrier tapes with a plurality of large scale integration (lsi) type components independent of requiring a conversion. The lsi type components include integrated circuits (ics), computer components, server components and computer components sized to fit into a carrier tape pocket. Implementations of the described techniques may include hardware, a method or process, or computer software on a computer-accessible medium.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

That which is claimed is:

1. An apparatus for detection of out of position (OOP) components in a carrier tape forming machine, the apparatus comprising:

cross track sensors coupled to the bus interface circuitry, the cross track sensors configured to detect OOP components prior to overlaying the components on the carrier tape with cover tape;

optical sensors to detect the OOP components on the carrier tape after overlaying with cover tape and prior to sealing, the optical sensors configured to detect reflections from OOP components seated on the carrier tape;

an amplifier coupled to the optical sensors, the amplifier coupled to amplify signals generated by the optical sensors and set a range for determining whether the components are OOP;

one or more relays coupled to the cross track sensors and the optical sensors, the relays configured to receive indications of detected OOP components in the carrier tape forming machine prior to sealing or prior to receipt by the cover plate; and a controller coupled to the one or more relays to stop the carrier tape forming machine as a function of signals received by the relays.

2. The apparatus of claim 1, further comprising bus interface circuitry coupled to the optical sensors and the amplifier, the bus interface circuitry connectable within the carrier tape forming machine to the controller.

3. The apparatus of claim 1, wherein the optical sensors are a pair of fiber optic sensors.

4. The apparatus of claim 1, wherein the sealing includes applying heat to seal a cover tape onto carrier tape to cover components.

5. The apparatus of claim 1, wherein out of position (OOP) components are outside a pocket in the carrier tape or components are offset in an x direction or in a y direction on the carrier tape.

6. The apparatus of claim 1, wherein the cross track sensors comprise at least two photoelectric sensors.

7. The apparatus of claim 1, wherein the optical sensors receive the range for OOP from the amplifier as a function of a size of the carrier tape.

8. The apparatus of claim 7, wherein size of the carrier tape is 44 mm with an OOP limit of 400 on each side of the carrier tape for 44 mm tape.

9. The apparatus of claim 7, wherein size of the carrier tape is 24 mm, with an OOP limit of between 600 and 650 for a left side and 300 for a right side.

10. The apparatus of claim 1, wherein the components are large scale integration (LSI) type components including integrated circuits (ICs), computer components, server components and computer components sized to fit into a carrier tape pocket.

11. A method for a carrier tape forming machine comprising:

detecting out of position (OOP) components on a carrier tape in two locations within the carrier forming machine including a first detecting prior to overlaying components with a cover tape, and a second detecting prior to sealing the cover tape to the carrier tape;

performing the first detecting using cross track sensors prior to overlaying components with cover tape;

performing the second detecting with fiber optic sensors by detecting reflections from OOP components to determine whether one or more components seated on the carrier tape after overlaying with cover tape and prior to sealing the cover tape;

amplifying the fiber optic sensor signal with an amplifier coupled to the fiber optic sensors to set a range for determining whether the components are OOP; and interrupting the carrier tape forming machine as a function of the detecting OOP components via received signals from one or more relays coupled to the cross track sensors and the fiber optic sensors, the relays configured to receive signal indicative of detected OOP components on the carrier tape forming machine prior to sealing and prior to receipt by the cover plate.

12. The method of claim 11, wherein the sealing includes applying heat to seal a cover tape onto carrier tape to cover components.

13. The method of claim 11, wherein out of position (OOP) components are outside a pocket in the carrier tape or components are offset in an x direction or in a y direction on the carrier tape.

14. The method of claim 11, wherein the cross track sensors comprise at least two photoelectric sensors.

15. The method of claim 11, wherein the optical sensors receive the range for OOP from the amplifier as a function of a size of the carrier tape.

16. The method of claim 11, wherein size of the carrier tape is 44 mm with an OOP limit of 400 on each side of the carrier tape for 44 mm tape.

17. The method of claim 11, wherein size of the carrier tape is 24 mm, with an OOP limit of between 600 and 650 for a left side and 300 for a right side.

18. The method of claim 11, wherein the components are large scale integration (LSI) type components including integrated circuits (ICs), computer components, server components and computer components sized to fit into a carrier tape pocket.

19. A system for a carrier tape forming machine comprising:

a memory;

processing circuitry coupled to the memory, the processing circuitry configured to:

detect out of position (OOP) components on a carrier tape in two locations within the carrier forming machine by performing a first detection prior to overlaying components with a cover tape, and a second detection prior to sealing the cover tape to the carrier tape;

perform the first detection using cross track sensors prior to overlaying components with cover tape;

perform the second detection with fiber optic sensors by detecting reflections from OOP components to determine whether one or more components seated on the carrier tape after overlaying with cover tape and prior to sealing the cover tape;

amplify the fiber optic sensor signal with an amplifier coupled to the fiber optic sensors to set a range for determining whether the components are OOP; and interrupt the carrier tape forming machine as a function of the detection of OOP components via received signals from one or more relays coupled to the cross track sensors and the fiber optic sensors, the relays configured to receive signal indicative of detected OOP components on the carrier tape forming machine prior to sealing and prior to receipt by the cover tape.

20. The system of claim 19, wherein the amplifier enables the carrier tape forming machine to detect OOP components and form carrier tapes with a plurality of large scale integration (LSI) type components independent of requiring a conversion.

* * * * *